KIRKMAN & GRAY.
Tire-Tightener.
No. 59,409.
Patented Nov. 6. 1866.
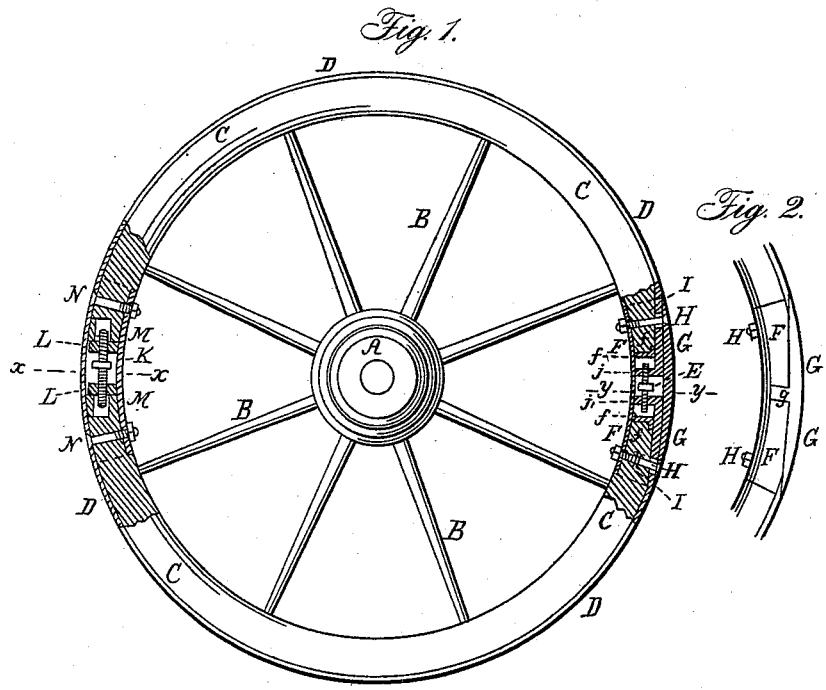
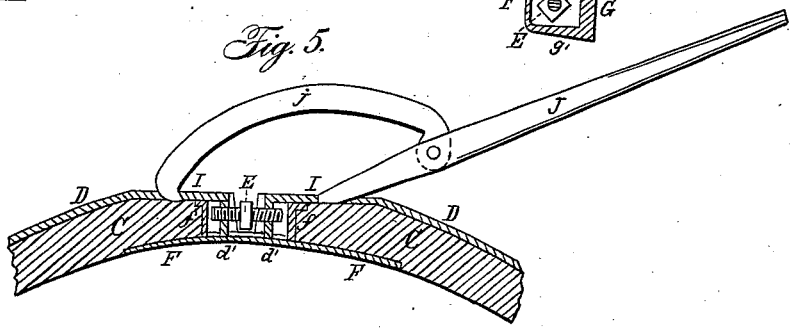
Witnesses:
J. B. Covington
Jas. A. Service
Inventor:
D. J. Kirkman
F. H. Gray
Per Munn & Co
Attorneys

UNITED STATES PATENT OFFICE.

D. J. KIRKMAN AND E. H. GRAY, OF WINCHESTER, ILLINOIS.

IMPROVEMENT IN TIGHTENING THE TIRES OF WHEELS.

Specification forming part of Letters Patent No. 59,409, dated November 6, 1866.

*To all whom it may concern:*

Be it known that we, D. J. KIRKMAN and E. H. GRAY, of Winchester, in the county of Scott and State of Illinois, have invented a new and useful Improvement in Wheels for Vehicles; and we do hereby declare that the following is a full, clear, and exact description thereof, which will enable others skilled in the art to make and use the same, reference being had to the accompanying drawings, forming part of this specification, in which—

Figure 1 is a side view of a wheel with our improvement attached, parts being broken away to show the construction. Fig. 2 is a detail view of a portion of a wheel with our improvement attached ready for use. Fig. 3 is a detail sectional view taken through the line $x\,x$, Fig. 1. Fig. 4 is a detail sectional view taken through the line $y\,y$, Fig. 1. Fig. 5 is a side view of a wrench to assist in straining the tire.

Similar letters of reference indicate like parts.

Our invention has for its object to furnish an improved means by which open or unwelded tires may be tightened or strained, and the fellies lengthened or shortened, as may be necessary, for the proper attachment of the tire; and it consists, first, in the combination of a cap or shoe having inwardly-projecting plates or partitions made solid therewith for the ends of the fellies to rest against with the ends of the fellies, with the flanged ends of the tire, and with the tightening-screw; second, in the combination of the outer plate with the ends of the tire, with the fellies, and with the cap, for the purpose of covering and protecting the ends of the tire; third, in slotting the ends of the tire, so that the tire may be tightened without closing the holes through which the bolts pass; fourth, in the combination of the screw bolts and nuts and the ends of the fellies, to enable the circumference of the wheel to be varied to fit the tire.

A is the hub of the wheel. B are the spokes, which are made and inserted in the hub A and fellies C in the ordinary manner. The fellies C, on opposite sides of the wheel, are shortened, or a space is left between their ends, as shown in Fig. 1.

D is the tire, which is open or unwelded, and has its ends bent down to form flanges $d'$, as shown in Fig. 1. Through the flanges $d'$ are formed holes having screw-threads cut therein, into which holes screw the ends of the bolt E, upon one end of which is cut a right screw and upon the other end a left screw, so that the two flanges $d'$ may both be drawn together or pushed apart equally by turning the said screw E. The body of the screw E is made square, as shown, in order that it may be grasped and operated by a wrench.

F is a cap made of such a form as to fit upon the inner side of the rim of the wheel, as shown in Figs. 1 and 2. The central part of the sides of the cap F are notched, to allow the end of the wrench to be inserted to operate the screw E. The outer or convex side of the ends of the fellies C are beveled off, as shown in Fig. 1, and also the edges of the cap F, as shown in Fig. 2, so that by forcing the tire D to conform thereto space may be obtained for the plate G. Within the cap F, and made solid therewith, are two plates or partitions, $f$, against which the ends of the fellies C rest. The upper edges of the plates $f$ are bent over and fit into notches formed in the ends of the fellies C, as shown in Fig. 1.

G is the plate that covers and protects the space between the ends of the tire D. The under side of this plate is flat to correspond with the bevel of the fellies C, and the upper side is an arc to correspond with the circle of the wheel. This plate G is secured in place by bolts H passing through the plate G, the ends of the tire D, the ends of the fellies C, and the cap F, and are held securely in place by nuts, as shown in Figs. 1 and 2. Upon the under side of the plate G are formed two projecting arms, $g'$, one on each side, which fit into the notches formed in the sides of the cap F, as before described, and closely close them. The space between these two arms $g'$ should be such as to allow the square body of the screw E to enter, and should fit so closely around it that it is unable to turn therein, thus guarding against the jar of the wheel working the said screw loose, and thus loosening the tire. The ends of the tire D, through which the bolts H pass, are slotted, as seen at I, Fig. 1, so that whether the tire be loose or drawn tight the bolts H may still be passed through them. By means of these slots the hook-lever J j may be attached to the tire to draw its ends together for the insertion of the screw E, and also to assist the said screw in straining the tire. In the space left between the ends of the fellies C on the opposite side of the wheel is placed a screw, K, upon the ends of which are cut a right and a left screw-thread. The central part or body of the screw K is made square, so that it may be grasped and operated by a wrench.

L are nuts fitting against the ends of the fellies and working upon the ends of the screw K, the ends of which can pass into recesses formed in the ends of the fellies, as shown in Fig. 1. By turning the screw K in one direction the nuts L are forced against the ends of the fellies C, pressing them apart, and enlarging the circumference of the wheel. By turning it in the other direction the nuts L are withdrawn from the ends of the fellies, allowing them to be drawn closer together by the pressure of the tire, thus enabling the tire and wheel to be accurately adjusted to each other.

M is a cap covering the opening between the fellies, to the ends of which and to the tire D it is secured by the bolts N, as shown in Fig. 1.

Having thus described our invention, we claim as new and desire to secure by Letters Patent—

The tire D, having slots I near its ends, in combination with the fellies, and operating substantially as described, for the purpose specified.

The above specification of our invention signed by us this 5th day of April, 1866.

D. J. KIRKMAN.
E. H. GRAY.

Witnesses:
L. C. SALLEO,
S. P. COONS.